United States Patent [19]

Adam et al.

[11] Patent Number: 4,899,432

[45] Date of Patent: Feb. 13, 1990

[54] METHOD FOR ADJUSTING THE AXIAL PLAY BETWEEN THE ROTOR AND A MOTOR

[75] Inventors: Peter Adam, Hochberg; Ronald Gleixner, Ochsenfurt, both of Fed. Rep. of Germany

[73] Assignee: Siemens Aktiengesellschaft, Berlin & Munich, Fed. Rep. of Germany

[21] Appl. No.: 292,653

[22] Filed: Dec. 28, 1988

Related U.S. Application Data

[63] Continuation of Ser. No. 909,219, Sep. 18, 1986, abandoned.

[30] Foreign Application Priority Data

Sep. 26, 1985 [DE] Fed. Rep. of Germany ....... 3534333

[51] Int. Cl.$^4$ .............................................. H02K 15/00
[52] U.S. Cl. ........................................ 29/596; 310/42; 310/43; 310/90; 384/296
[58] Field of Search ...................... 29/596; 310/42, 43, 310/90; 384/208, 296

[56] References Cited

U.S. PATENT DOCUMENTS

| 3,431,625 | 3/1969 | Schenk et al. | 310/42 |
| 3,432,700 | 3/1969 | Diederichs | 310/42 |
| 3,497,735 | 2/1970 | Diederichs et al. | 29/596 |
| 3,714,705 | 2/1973 | Lewis | 29/596 |
| 4,164,674 | 8/1979 | Buckman et al. | 310/90 |
| 4,170,058 | 10/1970 | Leffler | 29/596 |

FOREIGN PATENT DOCUMENTS

| 0065585 | 5/1981 | European Pat. Off. . |
| 0133527 | 7/1984 | European Pat. Off. . |
| 2242797 | 3/1975 | France . |
| 2154158 | 9/1985 | United Kingdom . |

*Primary Examiner*—P. W. Echols
*Attorney, Agent, or Firm*—Kenyon & Kenyon

[57] ABSTRACT

For a simple adjustment, suitable for automation, of the axial play between the rotor (1, 2) and the stator (5 to 8) of a miniature electric motor, at least one bearing (3) is axially moved relative to its bearing sleeve (51) in the end bell (5) and is fixed in its adjustment position by deformation of the bearing sleeve in a form-locking manner. For axial fixation, especially when used for drives with large axial loads, a thrust shoulder (511, 512) is formed after the axial play is adjusted for the axial contact of the adjusted bearing (15) from the bearing sleeve (51) by hot molding, ultrasonic heat deformation. Alternatively, precut tabs may be formed on the sleeve by embossing to form a thrust shoulder.

7 Claims, 1 Drawing Sheet

METHOD FOR ADJUSTING THE AXIAL PLAY BETWEEN THE ROTOR AND A MOTOR

This application is a continuation of application Ser. No. 909,219, filed Sept. 18, 1986, now abandoned.

BACKGROUND OF THE INVENTION

The invention relates to a method for adjusting the axial play between the rotor and the stator of a motor. Methods for adjusting axial play are disclosed, for instance, by European Patent 00 65 585 and European Patent Application 01 33 527.

In the case of European Patent 00 65 585, a spacer sleeve which is provided with a thrust shoulder at one end facing the bearing can be pressed into a concentric recess of an insulating end disc resting against the end face of a laminated rotor stack with an axial immersion depth corresponding to the respective axial play, serves for the adjustment of the axial play.

In European Patent Application 01 33 527, a disc with a thickness corresponding to the calculated axial play is placed in a pocket fixed to the stator housing, for limiting the axial play of a shaft supported in slide bearings.

A method for adjusting an axial play with the following process steps is known from British Patent A-2 154 158:

(a) a first bearing is arranged with a press fit in a first closing cap;
(b) the first closing cap is mounted;
(c) one end face of a stator is arranged resting against the closing cap;
(d) a rotor with a shaft is inserted into the stator, one end of the shaft being introduced into the bearing;
(e) the distance between the opposite end face of the stator and a point on the shaft is measured;
(f) a second closing cap containing a second bearing is arranged over the other end of the shaft;
(g) the second closing cap is advanced relative to the other the other end of the shaft, so that the shaft can be taken up by the second bearing until the second closing cap rests against the opposite end face of the stator; and
(h) the first bearing is pressed into the first closing cap by a distance which is related to the measured distance, in order to fix the axial play of the shaft.

However, if a force fit between the bearing and the bearing abutment is absolutely necessary, it cannot be assured with certainty that the fixed adjustment position can be maintained, for instance, if the motor is used under rough operating conditions. With the subject of the present invention, a force fit can be dispensed with so that, with automatic adjustment of the bearing, the latter can be moved precisely with a small pressure and therefore also with small adjustment and can, on the other hand, be fixed in its adjusted position reliably also for use under rough operating conditions.

SUMMARY OF THE INVENTION

An object of the present invention is provide a method for a particularly simple adjustment of the axial play which is possible with little effort by automatic handling machines.

The method according to the invention allows the adjustment of the axial play without any additional parts or additional stations for measuring said play and in an only axial handling direction, which is particularly advantageous for the employment of manipulators, in which the remaining parts are connected during the assembly of the motor. Once adjusted in the manufacture of the motor, the bearing is fixed in its adjusted position and remains fixed even under rough usage of these motors such as under shock load. An axial thrust shoulder is formed from the bearing sleeve after the axial play is adjusted.

Advantageously, the thrust shoulder, especially in the case of a plastic bearing bell, is formed by a melting process, preferably an ultrasonic melting process. In the case of metal end bells, alternatively, the forming is advantageously achieved by an embossing operation, wherein the bearing sleeve is bent to generate an axial thrust shoulder by means of tabs.

BRIEF DESCRIPTION OF THE FIGURES

The invention as well as further advantageous embodiments of the invention will be explained in the following with reference to the drawings, wherein.

DETAILED DESCRIPTION OF THE INVENTION

Figure 1:
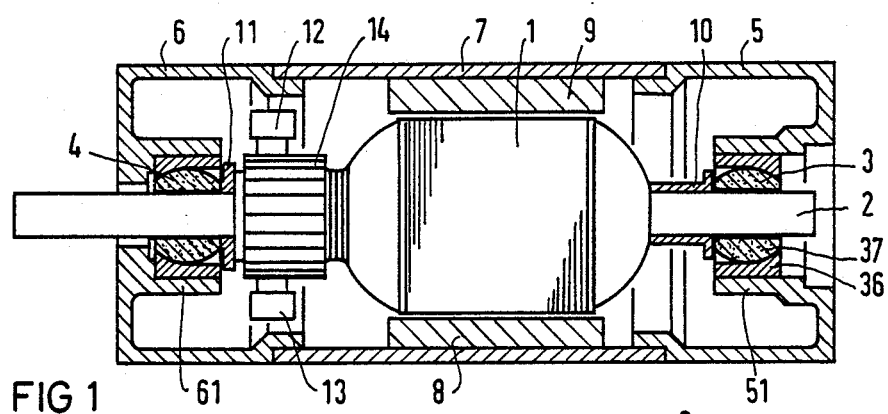
FIG. 1, shows an axial longitudinal section through a permanent magnet miniature motor with spherical bearings, prior to the adjustment of the axial play.

FIG. 1 shows a permanent-magnet commutator motor. Permanent magnet shells 8, 9 which generate the magnetic excitation field are arranged at the circumferential inside surface of the housing. At the end face, bearing brackets 5, 6 are fastened to the stator housing 7. The bearing brackets 5, 6 contain spherical bearings 3, 4, in which a rotor shaft 2 is rotatably supported. A laminated wound rotor stack 1 is fastened on the rotor shaft 2. A commutator 14 is cemented on the left shaft end of the rotor shaft 2 within the stator housing 7. Brush holders 12, 13 are supported in a brush bridge fixed to the stator housing in a manner not shown here in detail and are connected to external lines. The rotor winding which is wound on the rotor stack 1, is connected with its winding ends to the commutator 4. Between the left-hand spherical bearing 4 and the commutator 14, there is a thrust washer 11. Similarly, a spacer sleeve is disposed on the rotor shaft 2 between the right-hand end of the rotor lamination stack 1 and the right-hand spherical bearing 3, said spacer sleeve 10 having a thrust shoulder.

Figure 2:
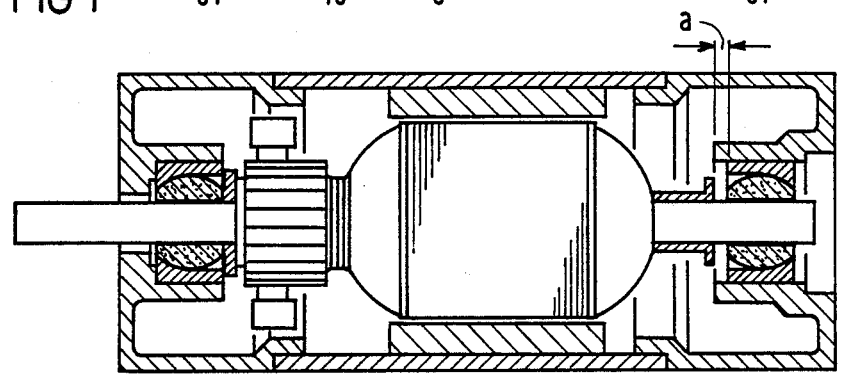
FIG. 2, shows the arrangement according to FIG. 1 after the axial play is adjusted.

While at the left end of the permanent-magnet commutator motor shown in FIGS. 1, 2 in an axial longitudinal section, the spherical bearing provided for the support of the rotor shaft 2 is arranged from the start as a fixed bearing in bearing sleeve 61 of the left bearing bracket 6, the right-hand spherical bearing 3 can be shifted axially to the right for defining axial play "a", shown in FIG. 2 with respect to the no-axial play of FIG. 1. At the start of the assembly of the permanent-magnet commutator motor, the spherical bearing held in the bearing sleeve 51 with a press fit providing radial pressure between the outer circumference of the bearing and the inner circumference of the bearing abutment. However, the spherical bearing is still easily moveable in response to a relatively light pressure, i.e., the spherical bearing is not force fit in the bearing sleeve. The spherical bearing is advantageously shifted to the left with its spherical sectors 37 supported in an outer bearing abutment 36 and a conventional clamp attached to the bearing sleeve so that after assembly but before the axial play is adjusted, the rotor has no axial play relative to the stator. By an axial forward push of the shaft 2 in the direction toward the right hand spherical bearing by the defined magnitude of the axial play to move said right hand spherical bearing to an adjusted position. The desired axial play adjustment can then be made in a simple operation without the need of measurement of the respective actual and reference axial play.

In one embodiment a particularly easy method is achieved which also assures the maintenance of the position of the spherical bearing 3 in its bearing sleeve 51 even under high axial shock.

For an explanation of the subject method, reference is made to the details of the right hand bearing abutment according to FIGS. 3 to 6 which describe the setting of the position of a cylinder bearing 15.

Figure 3:
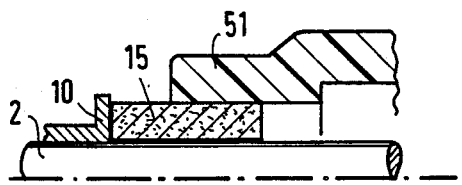
FIG. 3, shows in a detailed view, a cylinder bearing before the axial play is adjusted.
Figure 4:
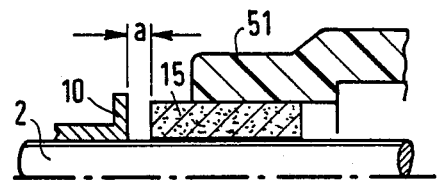
FIG. 4, shows the arrangement according to FIG. 3, after the axial play is adjusted.
Figure 5:
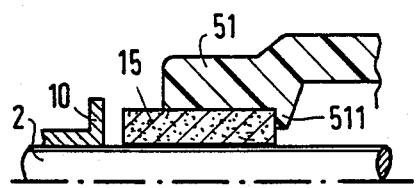
FIG. 5, shows the arrangement according to FIG. 4, after a thrust shoulder is formed from the bearing sleeve.
Figure 6:
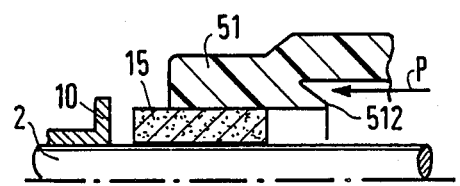
FIG. 6, shows a second embodiment of a formation of the thrust shoulder from the bearing sleeve.

FIG. 3 shows a cylinder bearing 15 held in the bearing sleeve 51 immediately after the assembly of the motor and therefore with no axial play, i.e., with a shoulder of the spacer sleeve 10 directly adjoining the left end face of the cylinder bearing 15. In FIG. 4, the cylinder bearing 15 is shown shifted by an axial displacement of the spacer sleeve 10 by the distance "a" further to the right into the bearing sleeve 51 and the spacer sleeve 10 is shown retracted to the left again into the position according to FIG. 3. FIG. 5 shows the arrangement of FIG. 4 but with a thrust shoulder 511 formed by deforming the plastic bearing sleeve 51 by molding. The thrust shoulder extends into the bearing hole and rests against the right hand end face of the cylinder bearing 15. FIG. 6 shows an alternative embodiment for forming a thrust shoulder 512, which is bent away as a thrust shoulder from the bearing sleeve 51 against the right hand end face of the cylinder bearing 15 by a compression tool P applied from the outside. Advantageously, the part to be bent is designed in tab fashion by slitting in such a manner that it is deformable by an operation P exerting pressure in the axial direction.

We claim:

1. A method for adjusting the axial play between the rotor and the stator of a motor, characterized by the features that an operating fixed bearing for the rotor shaft (2) is axially moved for adjusting the axial play relative to a bearing sleeve, and is fixed in an adjusted position by a subsequent deformation of the bearing sleeve.

2. The method according to claim 1, characterized by the feature that a spherical bearing (3) is held in a bearing sleeve (51) via an outer bearing abutment (36).

3. The method according to claim 1, characterized by the feature that a cylinder bearing (15) held in a bearing sleeve (51) is used as the bearing.

4. The method according to claim 1, characterized by the feature that the bearing is fixed by an axial thrust shoulder which is formed from the bearing sleeve after the axial play is adjusted.

5. The method according to claim 4, wherein said bearing sleeve is a plastic bearing sleeve, characterized by the feature that the thrust shoulder is formed from the bearing sleeve by a molding operation.

6. The method according to claim 5, especially for a plastic bearing sleeve, characterized by the feature that the thrust shoulder is formed from the bearing sleeve by a melting process, particularly an ultrasonic melting process.

7. The method according to claim 4, characterized by the feature that the thrust shoulder is formed from the bearing sleeve by an embossing process.

* * * * *